(12) United States Patent
Rahn et al.

(10) Patent No.: US 8,811,827 B2
(45) Date of Patent: Aug. 19, 2014

(54) SYSTEM FOR GENERATING OPTICAL RZ SIGNALS BASED ON ELECTRICAL RZ SIGNALS

(75) Inventors: Jeffrey T. Rahn, Sunnyvale, CA (US); Ilya Lyubomirsky, Temecula, CA (US); Alan C. Nilsson, Mountain View, CA (US); Vincent G. Dominic, Dayton, OH (US); Parmijit Samra, Fremont, CA (US)

(73) Assignee: Infinera Corporation, Sunnyvale, CA (US)

( * ) Notice: Subject to any disclaimer, the term of this patent is extended or adjusted under 35 U.S.C. 154(b) by 716 days.

(21) Appl. No.: 12/567,407

(22) Filed: Sep. 25, 2009

(65) Prior Publication Data

US 2011/0076019 A1    Mar. 31, 2011

(51) Int. Cl.
*H04B 10/556* (2013.01)
(52) U.S. Cl.
USPC .......................................................... 398/188
(58) Field of Classification Search
USPC .................................................. 398/65, 185
See application file for complete search history.

(56) References Cited

U.S. PATENT DOCUMENTS

| | | | |
|---|---|---|---|
| 8,068,742 B2* | 11/2011 | Cole et al. ..................... | 398/152 |
| 8,116,635 B2* | 2/2012 | Tanimura et al. ............. | 398/184 |
| 2004/0208646 A1* | 10/2004 | Choudhary et al. .......... | 398/188 |
| 2008/0138082 A1* | 6/2008 | Kang et al. .................... | 398/155 |
| 2008/0240728 A1 | 10/2008 | Wang et al. | |
| 2010/0067914 A1* | 3/2010 | Tanaka et al. ................. | 398/102 |

OTHER PUBLICATIONS

S. Chandrasekhar et al., Hybrid 107-Gb/s Polarization-Multiplexed DQPSK and 42.7-Gb/s DQPSK Transmission at 1.4-bits/s/Hz Spectral Efficiency over 1280 km of SSMF and 4 Bandwidth-Managed ROADMs', Optical Communication—Post Deadline Papers, 33$^{rd}$ European Conference and Exhibition, Sep. 16-20, 2007, pp. 1-2.
D. van den Borne et al., "PMD-Induced Transmission Penalties in Polarization-Multiplexed Transmission", Journal of Lightwave Technology, vol. 23, No. 12, Dec. 2005, pp. 4004-4015.
S. Hinz et al., "PMD tolerance of polarization division multiplex transmission using return-to-zero coding", Optics Express, vol. 9, No. 3, Jul. 30, 2001, pp. 136-140.
Lynn E. Nelson et al., Coherent crosstalk impairments in polarization multiplexed transmission due to polarization mode dispersion, Optics Express, vol. 7, No. 10, Nov. 6, 2000, pp. 350-361.
S. Chandrasekhar et al., "Experimental Investigation of System Impairments in Polarization Multiplexed 107-Gb/s RZ-DQPSK", OFC/NFOEC, 2008, OThU7.pdf.

\* cited by examiner

*Primary Examiner* — Ski K Li
(74) *Attorney, Agent, or Firm* — David L. Soltz

(57) ABSTRACT

Consistent with the present disclosure, polarized optical signals having the same wavelength are modulated in response to ERZ drive signals, to thereby yield corresponding RZ optical signals. Each of the polarized RZ optical signals includes a plurality of RZ transitions wherein the power of the optical signal returns to zero or a minimal power between bits or symbols. The phase or timing of the ERZ drive signals, however, is controlled, so that the RZ transitions in one polarized optical signal remain interleaved with the RZ transitions of the other polarized optical signal. Alternatively, the RZ transitions of the two polarized optical signals may be controlled so that the two are temporally aligned with one another. Thus, the timing of the RZ transitions of one polarized optical signal relative to the other polarized optical signal may be adjusted to optimize system performance.

18 Claims, 8 Drawing Sheets

SYSTEM FOR GENERATING OPTICAL RZ SIGNALS BASED ON ELECTRICAL RZ SIGNALS

BACKGROUND OF THE INVENTION

Optical communication systems are known that transmit optical signals that carry data as a series of bits. Such optical signals may be coded in accordance with a variety of different formats. Two commonly used formats are referred to return-to-zero (RZ) and non-return-to-zero (NRZ). In accordance with the RZ format, the optical signal returns or transitions to zero or a low power level between each bit or symbol (an "RZ transition"), even if a number of consecutive zeros or one bits occur in the signal. Since the signal returns to zero between each bit, a separate clock signal is, typically, not needed in the RZ signaling scheme.

Non-return-to-zero (NRZ) refers to a signaling scheme in which logic highs are represented by one significant condition and logic lows are represented by another significant condition with no neutral or rest condition, such as zero or lower power level. Since there is no rest state between successive bits, a synchronization signal is typically sent along with the data.

As generally understood, RZ formatted optical signals may have greater tolerance for low optical signal-to-noise ratio (OSNR), and/or high polarization mode dispersion (PMD). In one conventional approach, the optical signals are shaped into RZ formatted pulses with a so-called pulse carver, which may include a Mach-Zehnder modulator (MZM), for example. The MZM is provided in addition to other modulators required to modulate the optical signals with data, thereby adding to system cost and increasing the loss experienced by the transmitted optical signals.

In another approach, so-called electronic RZ or ERZ signals are used to drive the data modulators, thereby eliminating the need for an additional pulse carving modulator.

In order to further increase the data carrying capacity of optical communication systems, however, polarization multiplexing techniques have been employed in which data is modulated onto optical signals having the same wavelength but different polarizations, such as TE and TM polarizations. The optical signals are then combined onto an optical communication path, such as an optical fiber. If so-called advanced modulation formats are employed, such as differential quadrature phase shift keying (DQPSK), both the TE and TM optical signals, or portions thereof, may be supplied to the same photodetector or pair of balanced photodetectors. Accordingly, the TE and TM polarized optical signals may interfere or interact with each in such a way to create errors in the detected bits. In particular, it has been reported certain system impairments are mitigated if the RZ transitions of the TE and TM polarized optical signals are temporally aligned with each other, while other impairments are mitigated if such RZ transitions are temporarily spaced from one another or interleaved. See S. Chandrasekhar et al., "Experimental Investigation of System Impairments in Polarization Multiplexed 107-Gb/s RZ-DQPSK," Optical Fiber Communication Conference, 2008, the entire contents of which are incorporated herein by reference.

Accordingly, there is a need to control the timing of the RZ transitions between the TE and TM polarized optical signals in a polarization multiplexed optical communication system in order to achieve improved performance.

SUMMARY

In accordance with the present disclosure, an apparatus is provided that comprises a first phase adjusting circuit configured to receive a first electrical signal, which is modulated in accordance with a non-return-to-zero (NRZ) format to carry first data. The first phase adjusting circuit is configured to adjust a phase of the first electrical signal. A second phase adjusting circuit is also provided to receive a second electrical signal which is modulated in accordance with the NRZ format to carry second data. The second phase adjusting circuit is configured to adjust a phase of the second electrical signal. In addition, a first mixer circuit is provided that receives the first electrical signal and a clock signal. The first mixer is configured to output a third electrical signal, which is modulated in accordance with a return-to-zero (RZ) format and carries the first data. The third electrical signal includes a first plurality of RZ transitions. Further, a second mixer circuit is provided that is configured to receive the second electrical signal and the clock signal. The second mixer is configured to output a fourth electrical signal that is modulated in accordance with the RZ format and carries the second data. The fourth electrical signal includes a second plurality of RZ transitions. Moreover, a first phase of the first electrical signal and a second phase of the second electrical signal are adjusted by the first and second phase adjusting circuits, respectively, so that each of the first plurality of RZ transitions is temporally spaced from each of the second plurality of RZ transitions. In alternative embodiment, each of the first plurality of RZ transitions is aligned with a corresponding one of second plurality of RZ transitions.

Consistent with another aspect of the present disclosure, an apparatus is provided that comprises circuitry configured to receive a first plurality of electrical signals, each of which being modulated in accordance with a non-return-to-zero (NRZ) format. The circuitry is also configured to output a second plurality of electrical signals, each of which being modulated in accordance with an electrical return-to-zero (RZ) format. A first modulator configured to receive a first one of the second plurality of electrical signals. The first modulator outputs a first optical signal which is modulated in response to said first one of the second plurality of electrical signals, the first optical signal is further modulated in accordance an optical RZ format. In addition, a second modulator is provided that is configured to receive a second one of the second plurality of electrical signals. The second modulator outputs a second optical signal which is modulated in response to the second one of the second plurality of electrical signals. The second optical signal is further modulated in accordance with the optical RZ format.

The first optical signal carries first data that includes a first plurality of bits and a first plurality of RZ transitions, and the second optical signal carries second data that includes a second plurality of bits and a second plurality of RZ transitions. Each of the first plurality of RZ transitions is temporally spaced from each of the second plurality of RZ transitions. In another example, each of the first plurality of RZ transitions is temporally aligned with a corresponding one of the second plurality of RZ transitions.

It is to be understood that both the foregoing general description and the following detailed description are exemplary and explanatory only and are not restrictive of the invention, as claimed.

The accompanying drawings, which are incorporated in and constitute a part of this specification, illustrate various embodiments and together with the description, serve to explain the principles of the present disclosure.

DESCRIPTION OF THE EMBODIMENTS

Consistent with the present disclosure, polarized optical signals having the same wavelength or first and second optical signals having different wavelengths (wavelength channels) are modulated in response to ERZ drive signals, to thereby yield corresponding RZ optical signals. Each of the polarized RZ optical signals or wavelength channels includes a plurality of RZ transitions wherein the power of the optical signal returns to zero or a minimal power between bits or symbols. The phase, i.e., the timing, of the ERZ drive signals, however, is controlled, so that the RZ transitions in one polarized optical signal or wavelength channel remain interleaved with the RZ transitions of the other polarized optical signal or wavelength channel. Alternatively, the RZ transitions of the two polarized optical signals or wavelength channels may be controlled so that the two are temporally aligned with one another. Thus, the timing of the RZ transitions of one polarized optical signal relative to the other polarized optical signal may be adjusted to optimize system performance.

Reference will now be made in detail to the present exemplary embodiments, an examples of which are illustrated in the accompanying drawings. Wherever possible, the same reference numbers will be used throughout the drawings to refer to the same or like parts.

Figure 1:
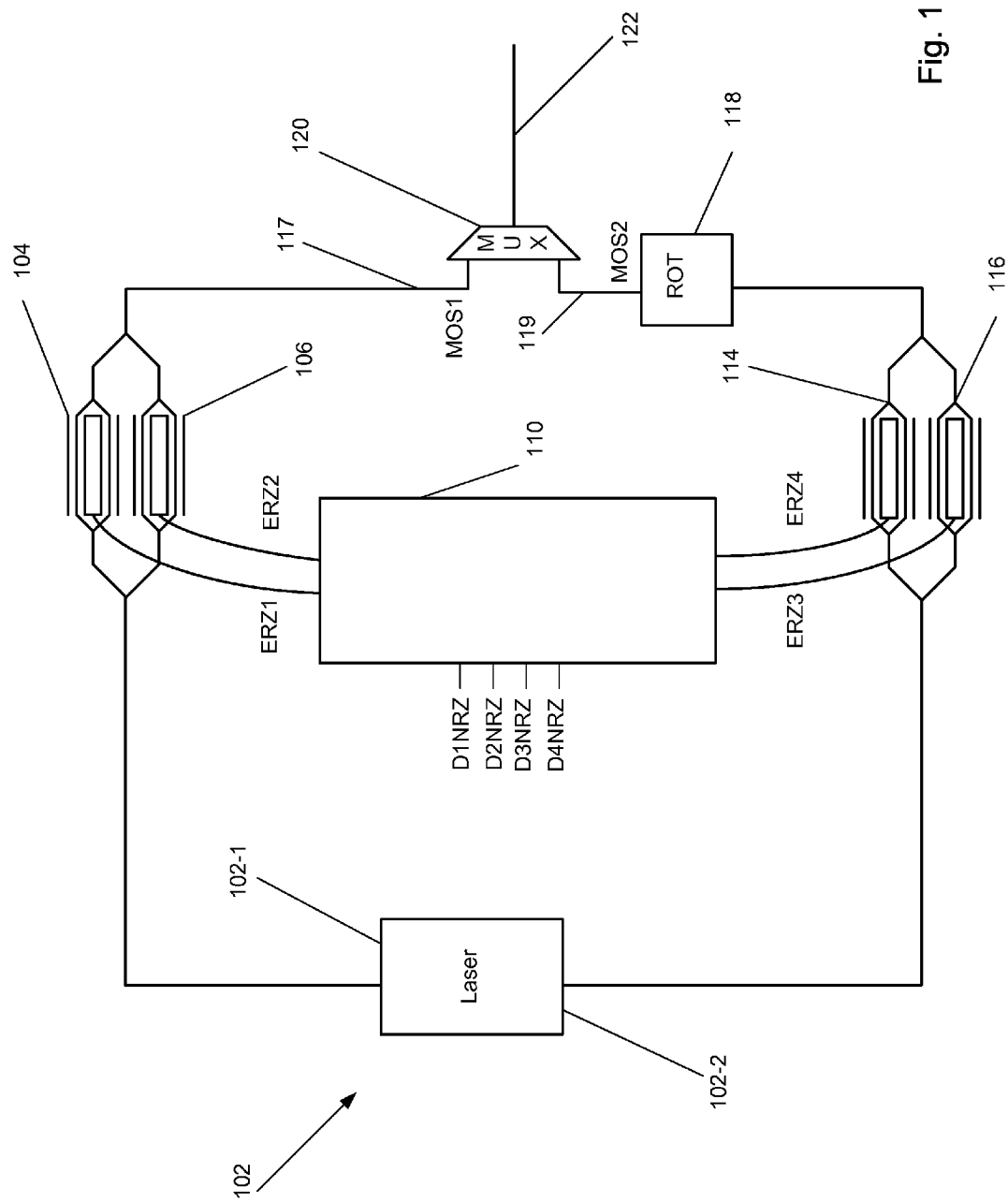
FIG. 1 illustrates a transmitter consistent with an aspect of the present disclosure.

FIG. 1 illustrates an example of a transmitter 100 consistent with an aspect of the present disclosure. Transmitter 100 includes laser 102 that has a first side 102-1 that supplies a first optical output having a wavelength (e.g., λ1) to a modulator pair ("nested modulators"), which includes, for example, Mach-Zehnder modulators 104 and 106. A second side 102-2 of laser 102 supplies a second optical output having the wavelength λ1 to another modulator pair including, for example, Mach-Zehnder modulators 114 and 116.

As further shown in FIG. 1, input electrical signals D1NRZ to D4NRZ are supplied to circuitry 110. Each of signals D1NRZ to D4NRZ carry data D1 to D4, respectively. Each of input electrical signals D1NRZ to D4NRZ is typically modulated in accordance with the NRZ (non-return-to-zero) format. As discussed in greater detail below, each of the input electrical signals is converted into corresponding electrical RZ signals ERZ1 to ERZ4, which, in turn, are supplied as drive signals to modulators 104, 106, 114, and 116, respectively. These modulators are configured, and the ERZ drive signals supplied thereto are formatted, in a known manner to output signals that are modulated to carry data D1 to D4 in accordance with a differential quadrature phase shift keying (DQPSK) format.

The outputs of modulators 114 and 116 (collectively, MOS1) are combined and the polarization thereof is rotated by optical rotator 118. After such rotation, MOS1 typically has a polarization different than the polarization of optical signals output from modulators 104 and 106 (collectively, MOS2). For example, MOS1 may have a TE polarization and MOS2 may have a TM polarization. MOS1 and MOS2 are supplied on input waveguides 117 and 119, respectively of multiplexer 120, which combines these signals onto an output waveguide 122, for example, to provide a polarization multiplexed optical signal having wavelength λ1. Multiplexer 120 may include a known polarization beam combiner, for example.

Although not shown circuitry 110 may include individual circuits, such as retiming circuits to adjust the timing or synchronization of drive signals ERZ1 to ERZ4. In addition, dual driver circuits may included in circuitry 110 which output pairs of drive signals, such as ERZ1 and ERZ2, as well as ERZ3 and ERZ4.

Figure 2A:
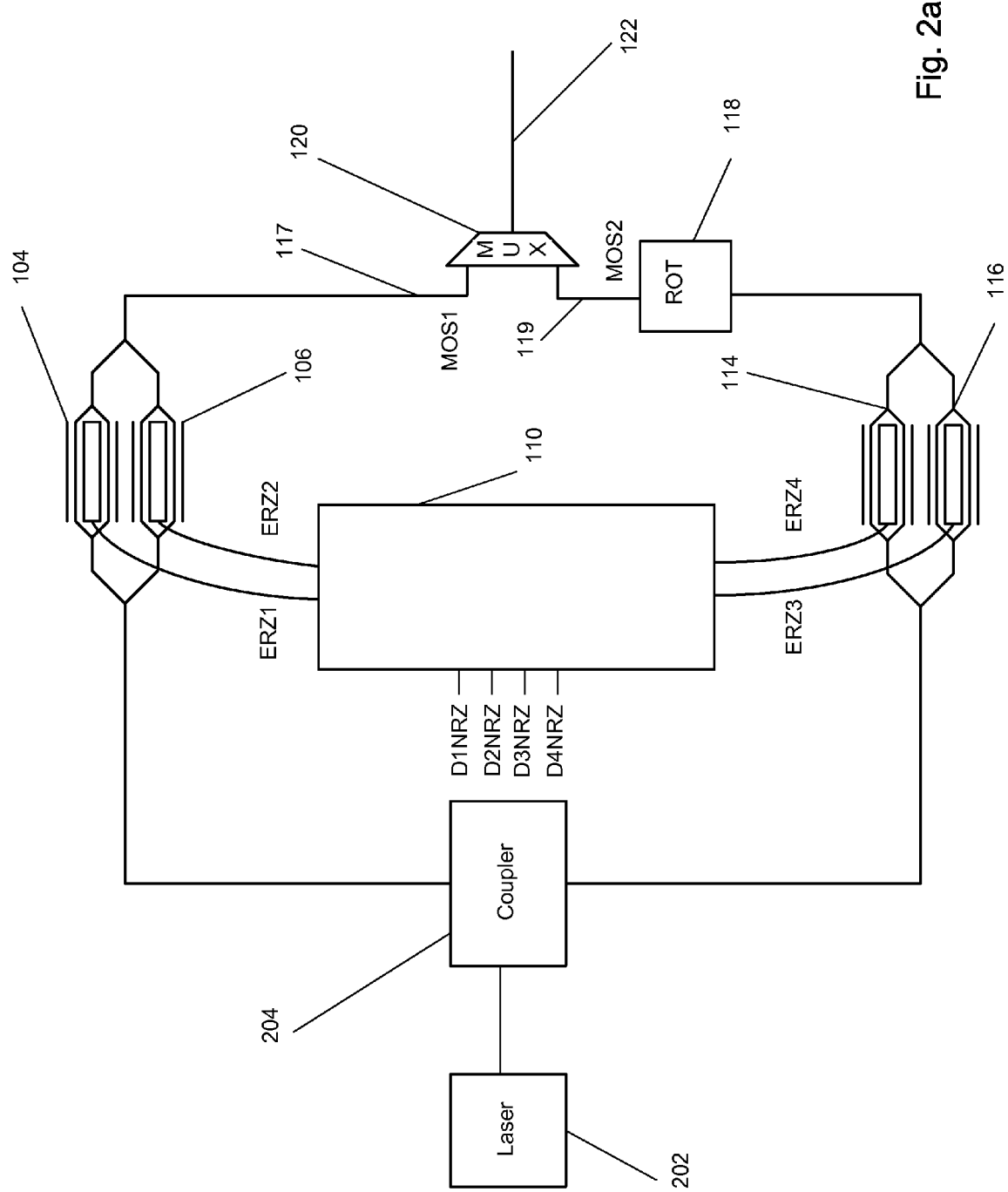
FIGS. 2a and 2b illustrates an alternative transmitters consistent with an additional aspect of the present disclosure.

FIG. 2a illustrates an alternative transmitter 200, which includes similar structure and operates in a similar fashion to transmitter 100 discussed above. Transmitter 200, however, includes a laser 202 that supplies an optical output to an optical coupler or splitter 204, which has a first output port 204-1 that supplies a first portion of the optical output to modulators 104 and 106, and a second output port 204-2 that supplies a second portion of the optical output to modulators 114 and 116.

Figure 2B:
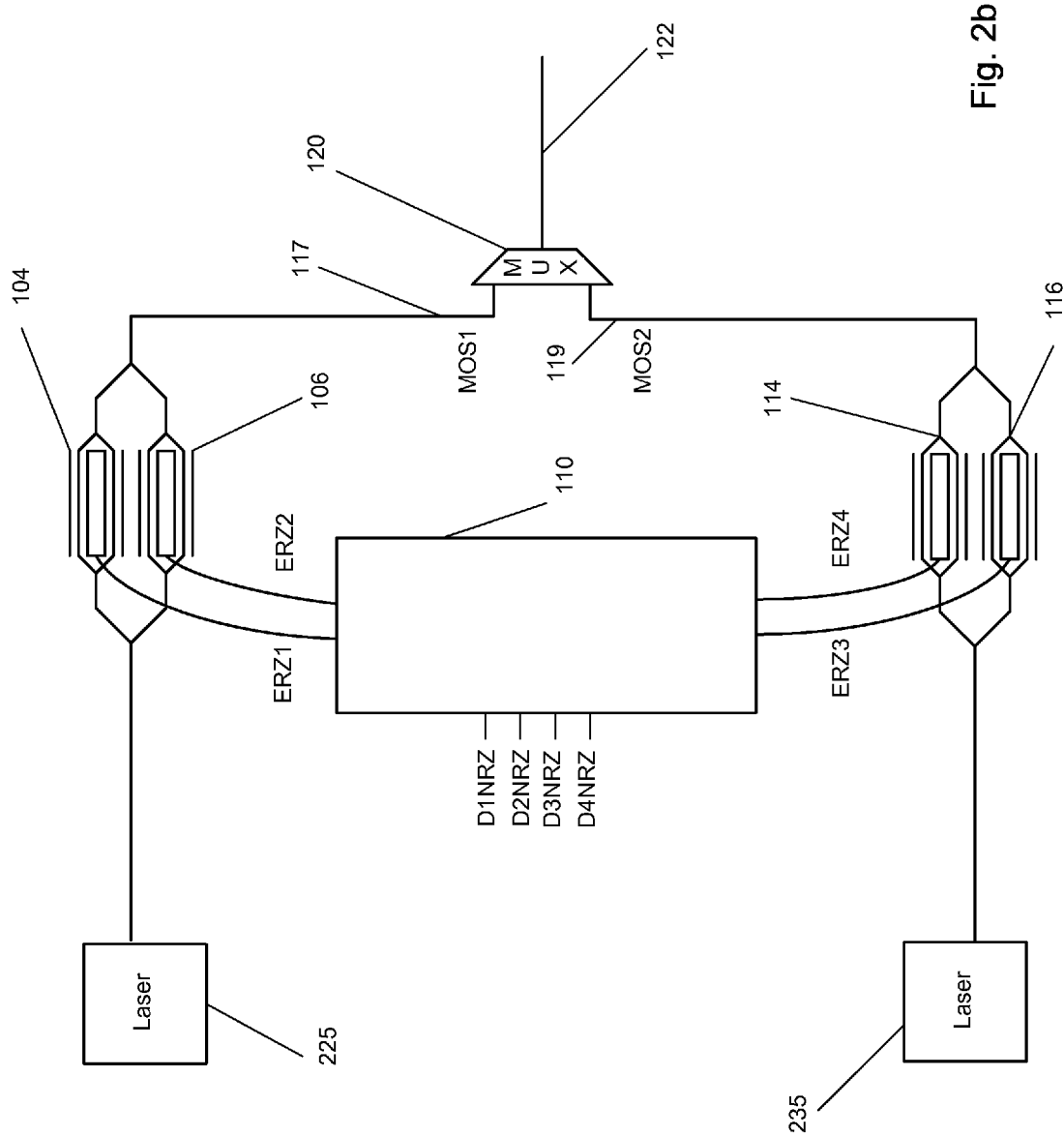

In the example shown in FIG. 2b, splitter 204 is omitted and an additional laser is provided. Namely, a first laser 225 supplies first light to modulators 104 and 106, while a second laser supplies second light to modulators 114 and 116. Typically, the wavelengths of outputs from lasers 225 and 235 is different, but spectrally close to one another, such that the wavelength channels or modulated optical outputs (MOS1 and MOS2) may interfere with one another. Accordingly, the timing of these signals or channels may be adjusted as discussed below in order to improve performance.

Figure 3:
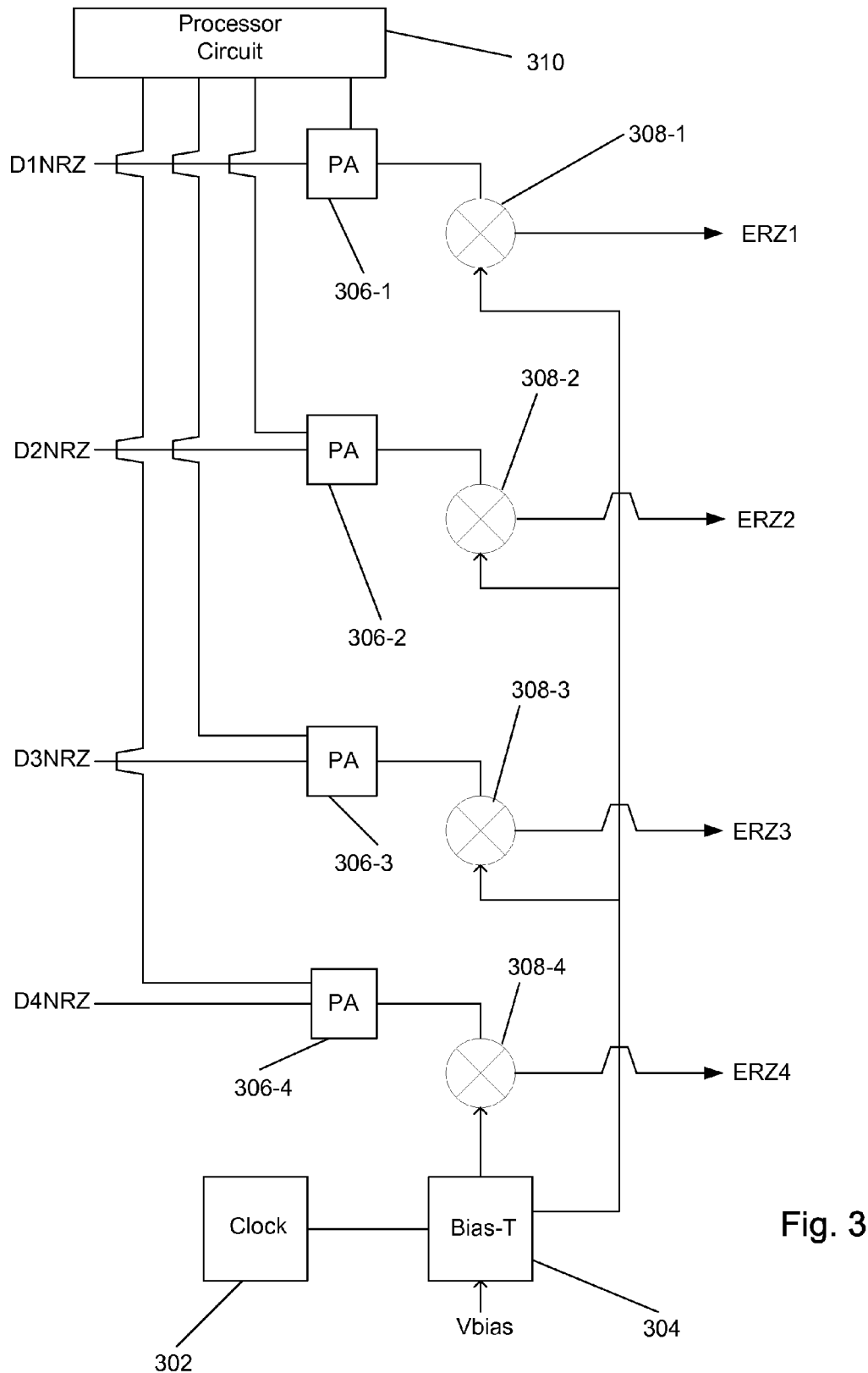
FIG. 3 illustrates a portion of a driver circuit consistent with an aspect of the present disclosure.

FIG. 3 shows circuitry 110 in greater detail. Circuitry 110 includes a plurality of phase adjusting circuits, 306-1 to 306-4, each of which being configured to adjust a timing of a corresponding one of input electrical signals D1NRZ to D4NRZ. Each of the phase adjust signals D1NRZ to D4NRZ are supplied to a corresponding one of mixer circuits 308-1 to 308-4 that also receive an output from a known bias-T circuit 304. A clock circuit 302 may also be provided to supply a clock signal to the bias-T circuit, as well as a bias voltage Vbias. As generally understood, the bias-T circuit supplies the combined clock and bias voltage to each of mixers 308-1 to 308-4, which mix or add these input to the phase or timing adjusted signals D1NRZ to D4NRZ, to thereby output electrical RZ signals or drive signals ERZ1 to ERZ4. A processor circuit 310 may also be provided that supplies control signals to each of the phase adjusting circuits 306-1 to 306-4 to adjust the timing or phase associated therewith. Circuitry 110 may include other components, which are not shown in FIG. 3 out of convenience.

Figure 4:
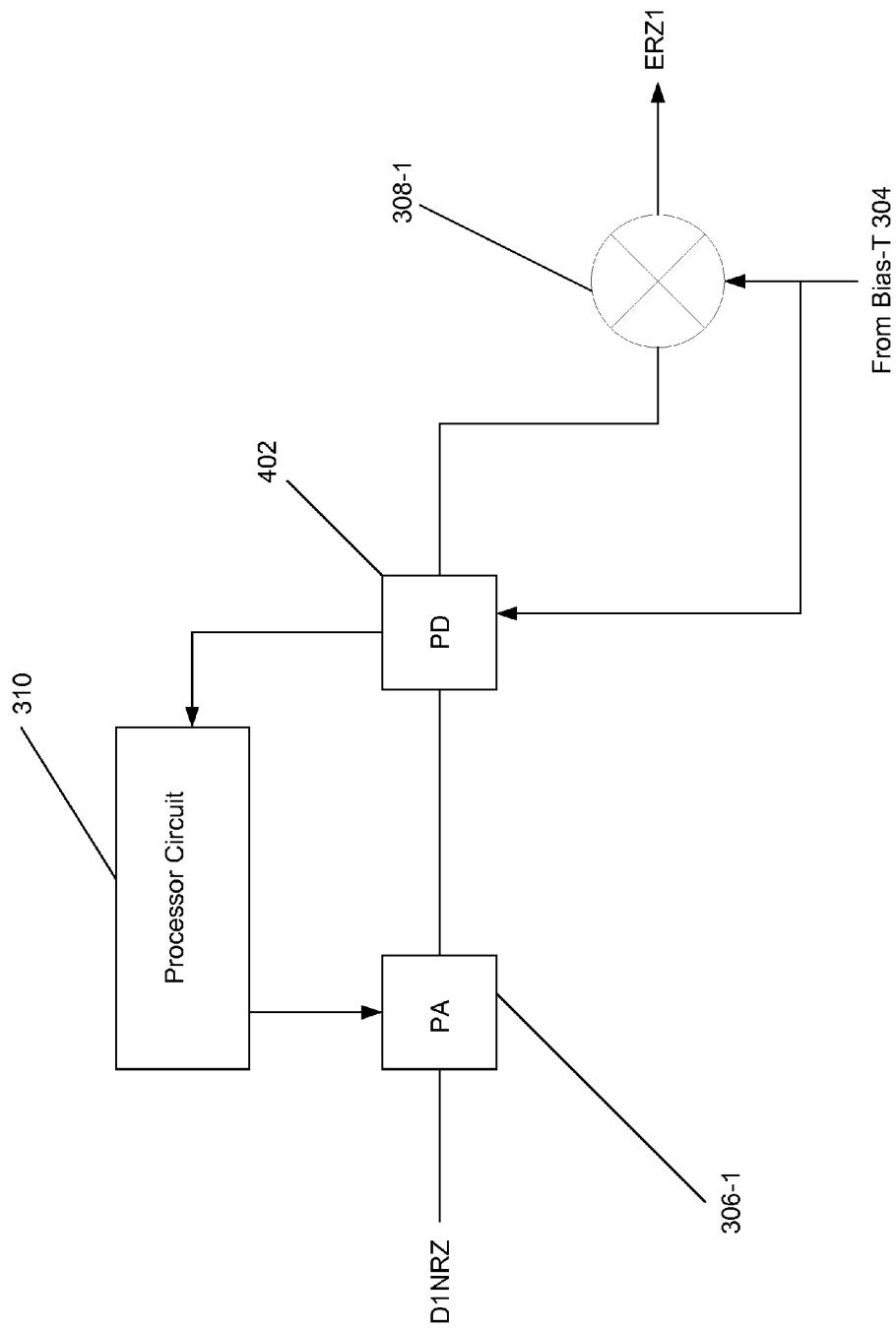
FIG. 4 illustrates a feedback circuit consistent with an aspect of the present disclosure.

FIG. 4 illustrates an example of a feedback circuit 400, which may be used to control the timing associated with one of phase adjusting circuits 306-1. It is understood that similar feedback circuits may be provided in connection with remaining phase adjusting circuits 306-2 to 306-4. Feedback circuit 400 includes a phase detector circuit (PD) 402 that receives the phase adjusted signal D1NRZ output from phase adjusting circuit 306-1. PD 402 may be configured to detect the timing of this signal, as well as the phase or timing of a clock signal included in the output from bias-T circuit 304. PD 402 supplies a phase-detect signal or signals to processor circuit 310 and also provides the monitored signal D1NRZ to mixer 308-1. Based on such phase detect signals, processor circuit 310 outputs a control signal to phase adjusting circuit 306-1 indicative of a desired phase or timing of D1NRZ. Phase adjusting circuit 306-1 adjusts the timing of D1NRZ accordingly. When mixed or multiplied by mixer 308-1, the resulting signal ERZ1 will also have the corresponding desired timing.

Figure 5:
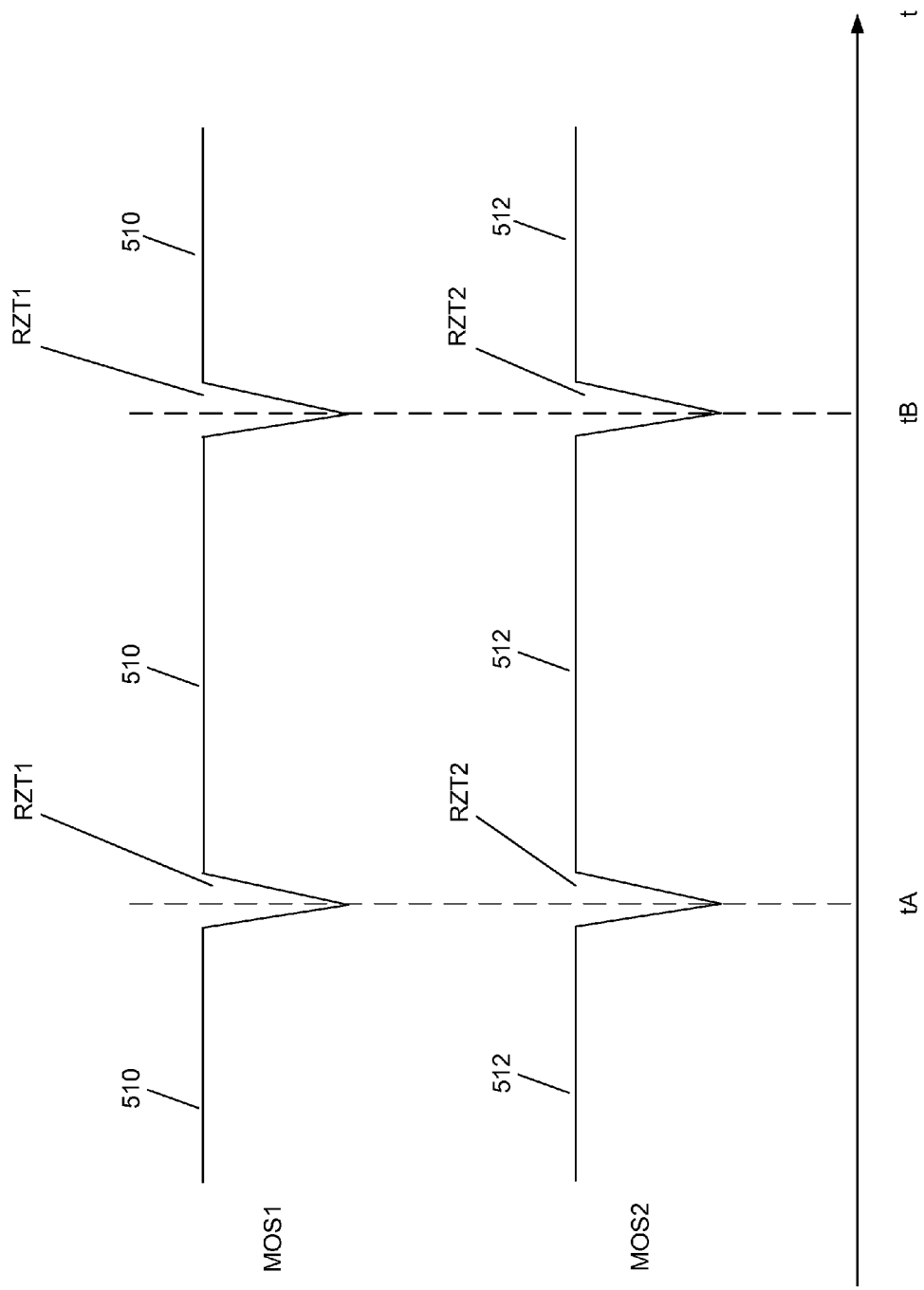
FIGS. 5 and 6 illustrate exemplary timing diagrams of signals generated consistent with the present disclosure.
Figure 6:
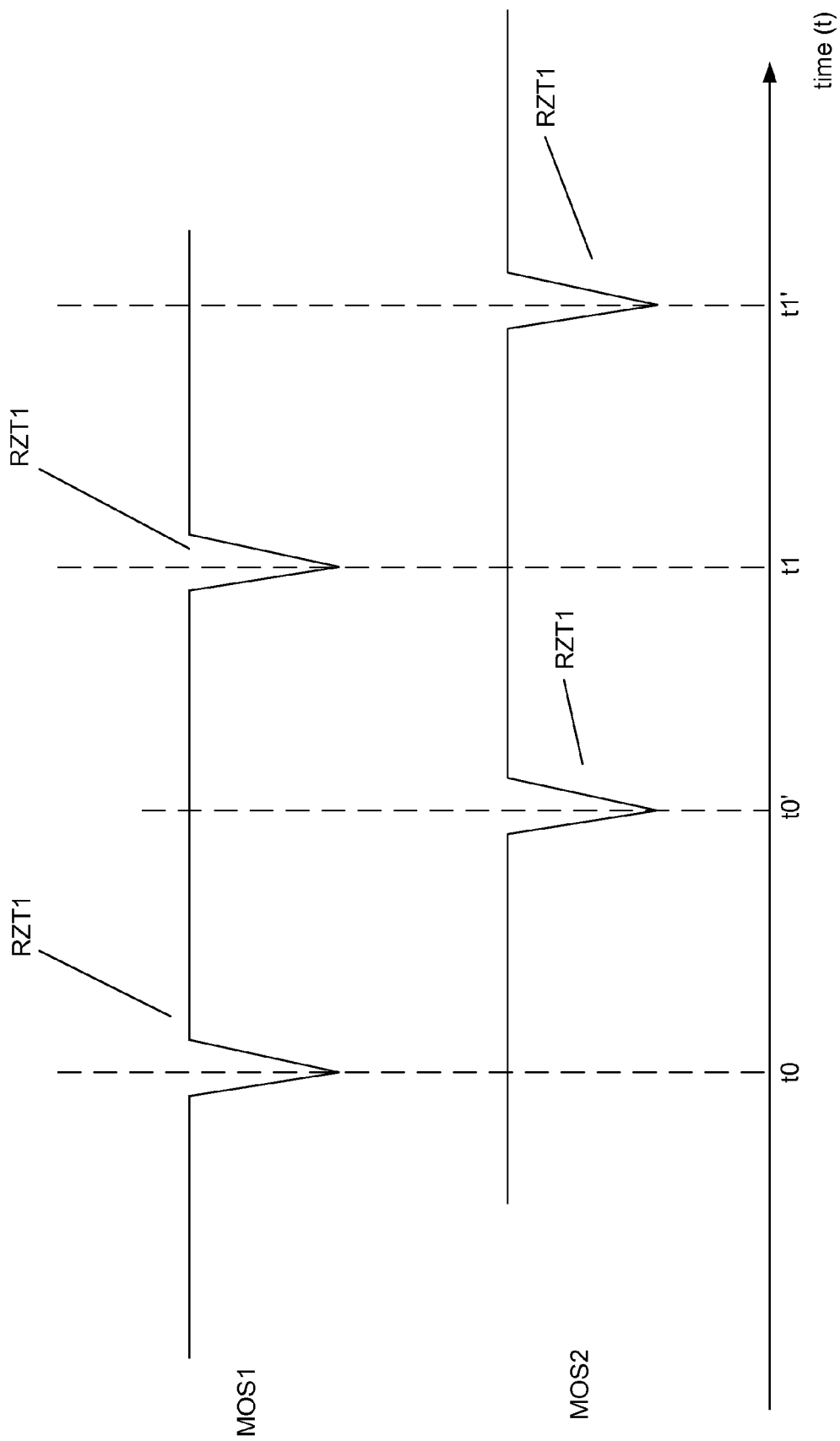

As a result of the ERZ signal phase or timing adjustment discussed above, the timing of RZ modulated optical signals generated in response to the ERZ signals (e.g., MOS1 and MOS2) may also be adjusted and maintained. For example, the RZ transitions (i.e., a zero or low power portion of the signal between adjacent symbols or bits) of MOS1 (having a TE polarization, for example or a given wavelength) and MOS2 (having a TM polarization, for example, or a different wavelength than that of MOS1) may be adjusted relative to one another in accordance with system parameters. In particular, as shown in FIG. 5, RZ transitions RZT1 between symbols 510 of signal MOS1 may be temporally aligned with RZ transitions RZT2 between symbols 512 of signal MOS2 to coincide at times tA and TB, for example. Alternatively, as shown in FIG. 6, RZ transitions RZT1 and RZT2 may be temporally offset or spaced from each other, whereby RZ transitions RZT1 coincide with times t0 and t1, while RZ transitions RZT2 coincide with times t0' and t1'.

Figure 7:
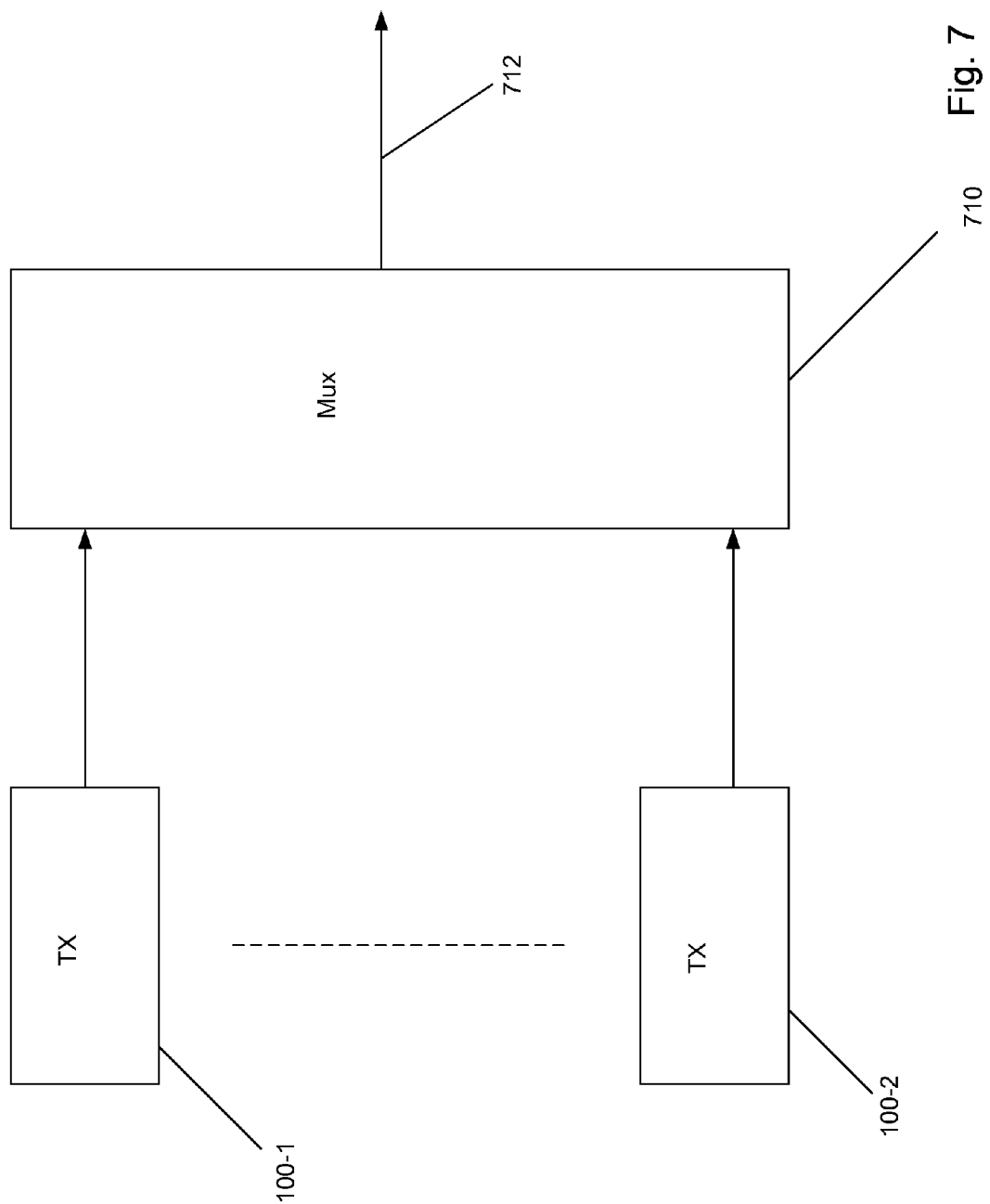
FIG. 7 is an example of a wavelength division multiplexed (WDM) optical communication system consistent with a further aspect of the present disclosure.

FIG. 7 illustrates a wavelength division multiplexed (WDM) system 700 consistent with a further aspect of the present disclosure. WDM system 700 includes a plurality of transmitters 100-1 to 100-n, each of having a structure similar to one of transmitters 100 or 200 discussed above in connection with FIGS. 1, 2a, and 2b. Each of transmitters 100-1 to 100-n outputs polarization multiplexed optical signals λ1 to λn, which are generated in a manner similar to that described above. These optical signals are fed to a known wavelength combiner 710, such as an arrayed waveguide grating (AWG), for example, that combines the received signals onto a common waveguide or optical path 712.

As noted above, the phase or timing of ERZ modulator drive signals may be adjusted to yield a desired timing of the RZ transitions of corresponding modulated optical signals. As a result, such RZ transition timing can be controlled to provide optimal system performance. For example, if a particular system has a relatively large amount of polarization mode dispersion (PMD), the RZ transitions of the polarized optical signals within each WDM channel may be aligned. The RZ transitions of relatively closely spaced wavelength channels may also be aligned, since such channels may also be affected by PMD in a similar fashion. However, if the system suffers from other non-linearities instead, the RZ transtions of both polarized optical signals and wavelength channels may be adjusted to be interleaved.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus, comprising:
    circuitry configured to receive a first plurality of electrical signals, each of which being modulated in accordance with a non-return-to-zero (NRZ) format, the circuitry further being configured to output a second plurality of electrical signals, each of which being modulated in accordance with an electrical return-to-zero (RZ) format, a phase of one of the first plurality of electrical signals being based on a timing of said one of the plurality of electrical signals and a timing of an input electrical signal;
    a first modulator configured to receive a first one of the second plurality of electrical signals, the first modulator outputting a first optical signal which is modulated in response to said first one of the second plurality of electrical signals, the first optical signal further being modulated in accordance an optical RZ format;
    a second modulator configured to receive a second one of the second plurality of electrical signals, the second modulator outputting a second optical signal which is modulated in response to said second one of the second plurality of electrical signals, the second optical signal further being modulated in accordance with the optical RZ format;
    a third modulator configured to receive a third one of the second plurality of electrical signals, the third modulator outputting a third optical signal which is modulated in response to said third one of the second plurality of electrical signals, the third optical signal further being modulated in accordance with the optical RZ format, the third optical signal being combined with the first optical signal;
    a fourth modulator configured to receive a fourth one of the second plurality of electrical signals, the fourth modulator outputting a fourth optical signal which is modulated in response to said fourth one of the second plurality of electrical signals, the fourth optical signal further being modulated in accordance with the optical RZ format, the fourth optical signal being combined with the second optical signal; and
    a multiplexer having a first input, a second input, and an output waveguide, the first input receiving the combined first and third optical signals and the second input receiving the combined second and fourth optical signals, the first, second, third, and fourth optical signals being combined onto the output waveguide,
    wherein the first optical signal carries first data including a first plurality of bits and a first plurality of RZ transitions, the third optical signal carries third data including a third plurality of bits and the first plurality of RZ transitions, the second optical signal carries second data including a second plurality of bits and a second plurality of RZ transitions, and the fourth optical signal carries fourth data including a fourth plurality of bits and the second plurality of RZ transitions, each of the first plurality of RZ transitions being temporally spaced from each of the second plurality of RZ transitions.

2. An apparatus in accordance with claim 1, further including an optical rotator, the optical rotator being configured to rotate a polarization of the second optical signal.

3. An apparatus in accordance with claim 2, wherein the rotated polarization of the second optical signal is substantially orthogonal to a polarization of the first optical signal.

4. An apparatus in accordance with claim 3, wherein the rotated polarization of the second optical signal has one of a TE and TM polarization and the polarization of the first optical signal is the other of the TE and TM polarization.

5. An apparatus in accordance with claim 1, further including a polarization beam combiner.

6. An apparatus in accordance with claim 1, wherein the first optical signal and the second optical signal are further modulated by the first and second modulators, respectively, in accordance with a differential quadrature phase shift keyed (DQPSK) format.

7. An apparatus in accordance with claim 1, further including a laser, the laser having a first side that supplies a first optical output to the first modulator and a second side that supplies a second optical output to the second modulator.

8. An apparatus in accordance with claim 1, further including:
   a laser that supplies an optical output;
   an optical splitter having an input configured to receive the optical output and first and second output ports, the first output port of the optical splitter supplying a first portion of the optical output to the first modulator, and the second output port supplying a second portion of the optical output to the second modulator.

9. An apparatus in accordance with claim 1, wherein the first optical signal has a first wavelength and the second optical signal has a second wavelength different than the first wavelength.

10. An apparatus, comprising:
   circuitry configured to receive a first plurality of electrical signals, each of which being modulated in accordance with a non-return-to-zero (NRZ) format, the circuitry further being configured to output a second plurality of electrical signals, each of which being modulated in accordance with an electrical return-to-zero (RZ) format, a phase of one of the first plurality of electrical signals being based on a timing of said one of the plurality of electrical signals and a timing of an input electrical signal;
   a first modulator configured to receive a first one of the second plurality of electrical signals, the first modulator outputting a first optical signal which is modulated in response to said first one of the second plurality of electrical signals, the first optical signal further being modulated in accordance an optical RZ format;
   a second modulator configured to receive a second one of the second plurality of electrical signals, the second modulator outputting a second optical signal which is modulated in response to said second one of the second plurality of electrical signals, the second optical signal further being modulated in accordance with the optical RZ format;
   a third modulator configured to receive a third one of the second plurality of electrical signals, the third modulator outputting a third optical signal which is modulated in response to said third one of the second plurality of electrical signals, the third optical signal further being modulated in accordance with the optical RZ format, the third optical signal being combined with the first optical signal;
   a fourth modulator configured to receive a fourth one of the second plurality of electrical signals, the fourth modulator outputting a fourth optical signal which is modulated in response to said fourth one of the second plurality of electrical signals, the fourth optical signal further being modulated in accordance with the optical RZ format, the fourth optical signal being combined with the second optical signal; and
   an optical multiplexer having a first input, a second input, and an output waveguide, the first input receiving the combined first and third optical signals and the second input receiving the combined second and fourth optical signals, the first, second, third, and fourth optical signals being combined onto the output waveguide,
   wherein the first optical signal carries first data including a first plurality of bits and a first plurality of RZ transitions, the third optical signal carries third data including a third plurality of bits and the first plurality of RZ transitions, the second optical signal carries second data including a second plurality of bits and a second plurality of RZ transitions, and the fourth optical signal carries fourth data including a fourth plurality of bits and the second plurality of RZ transitions, each of the first plurality of RZ transitions being substantially temporally aligned with a corresponding one of the second plurality of RZ transitions.

11. An apparatus in accordance with claim 10, further including an optical rotator, the optical rotator being configured to rotate a polarization of the second optical signal.

12. An apparatus in accordance with claim 11, wherein the rotated polarization of the second optical signal is substantially orthogonal to a polarization of the first optical signal.

13. An apparatus in accordance with claim 12, wherein the rotated polarization of the second optical signal has one of a TE and TM polarization and the polarization of the first optical signal is the other of the TE and TM polarization.

14. An apparatus in accordance with claim 10, further including a polarization beam combiner.

15. An apparatus in accordance with claim 10, wherein the first optical signal and the second optical signal are further modulated by the first and second modulators, respectively, in accordance with a differential quadrature phase shift keyed (DQPSK) format.

16. An apparatus in accordance with claim 10, further including a laser, the laser having a first side that supplies a first optical output to the first modulator and a second side that supplies a second optical output to the second modulator.

17. An apparatus in accordance with claim 10, further including:
   a laser that supplies an optical output;
   an optical splitter having an input configured to receive the optical output and first and second output ports, the first output port of the optical splitter supplying a first portion of the optical output to the first modulator, and the second output port supplying a second portion of the optical output to the second modulator.

18. An apparatus in accordance with claim 10, wherein the first optical signal has a first wavelength and the second optical signal has a second wavelength different than the first wavelength.

* * * * *